United States Patent
Sasaki (10) Patent No.: US 7,953,136 B2
(45) Date of Patent: May 31, 2011

(54) TRANSMISSION CIRCUIT AND SYSTEM FOR THE SAME

(75) Inventor: Yasufumi Sasaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 791 days.

(21) Appl. No.: 11/979,791

(22) Filed: Nov. 8, 2007

(65) Prior Publication Data

US 2008/0112466 A1 May 15, 2008

(30) Foreign Application Priority Data

Nov. 14, 2006 (JP) .................................. 2006-307479

(51) Int. Cl.
*H04B 1/69* (2006.01)

(52) U.S. Cl. ........ 375/135; 375/130; 375/133; 375/376; 375/134; 370/328; 370/480; 455/234.1; 455/232.1; 455/115.2

(58) Field of Classification Search .................. 375/130, 375/132, 135, 134, 133, 345, 376; 370/328, 370/480; 455/115.2, 234.1, 232.1
See application file for complete search history.

(56) References Cited

U.S. PATENT DOCUMENTS

| | | | | |
|---|---|---|---|---|
| 5,459,760 A | * | 10/1995 | Watanabe | 375/134 |
| 2003/0100281 A1 | * | 5/2003 | Zipper | 455/234.1 |
| 2005/0141594 A1 | * | 6/2005 | Smith et al. | 375/130 |
| 2007/0049212 A1 | * | 3/2007 | Dunworth et al. | 455/76 |
| 2007/0053451 A1 | * | 3/2007 | French et al. | 375/260 |
| 2007/0201535 A1 | * | 8/2007 | Ahmed | 375/135 |
| 2007/0237121 A1 | * | 10/2007 | Khandelwal et al. | 370/338 |

FOREIGN PATENT DOCUMENTS

| | | |
|---|---|---|
| JP | 6-37652 | 2/1994 |
| JP | 8-316880 | 11/1996 |
| JP | 9-139694 | 5/1997 |
| JP | 11-340908 | 12/1999 |
| JP | 2005-269202 | 9/2005 |

* cited by examiner

*Primary Examiner* — Eva Y Puente
(74) *Attorney, Agent, or Firm* — McGin Intellectual Property Law Group, PLLC (57) ABSTRACT

According to the present invention, there is provided a transmission circuit transmitting a power signal using frequency hopping system from an antenna connected to the transmission circuit through a transmission path, the transmission circuit including: a controller outputting an amplitude set value for each hopping frequency of the power signal before being transmitted according to power level of the power signal at the antenna; a pre-driver controlling the amplitude of the power signal before being transmitted for each hopping frequency according to the amplitude set value; and a power amplifier outputting the power signal to the transmission path according to the signal output from the pre-driver.

7 Claims, 6 Drawing Sheets

TRANSMISSION CIRCUIT AND SYSTEM FOR THE SAME

BACKGROUND OF THE INVENTION

1. Field of the Invention

The present invention relates to a transmission circuit and a system for the same, and, more particularly, to a transmission circuit outputting power signal using frequency hopping system and a system having the transmission circuit.

2. Description of Related Art

A device that transmits and receives data using wireless signal outputs power signal from an antenna connected to an output of a transmission circuit through a transmission path. However, in the transmission path, power loss generally occurs. Therefore, even when the signal is output from the transmission circuit in a desired power, power level of the power signal output from the antenna can be attenuated compared with the power level of the power signal output from the transmission circuit.

Figure 5:
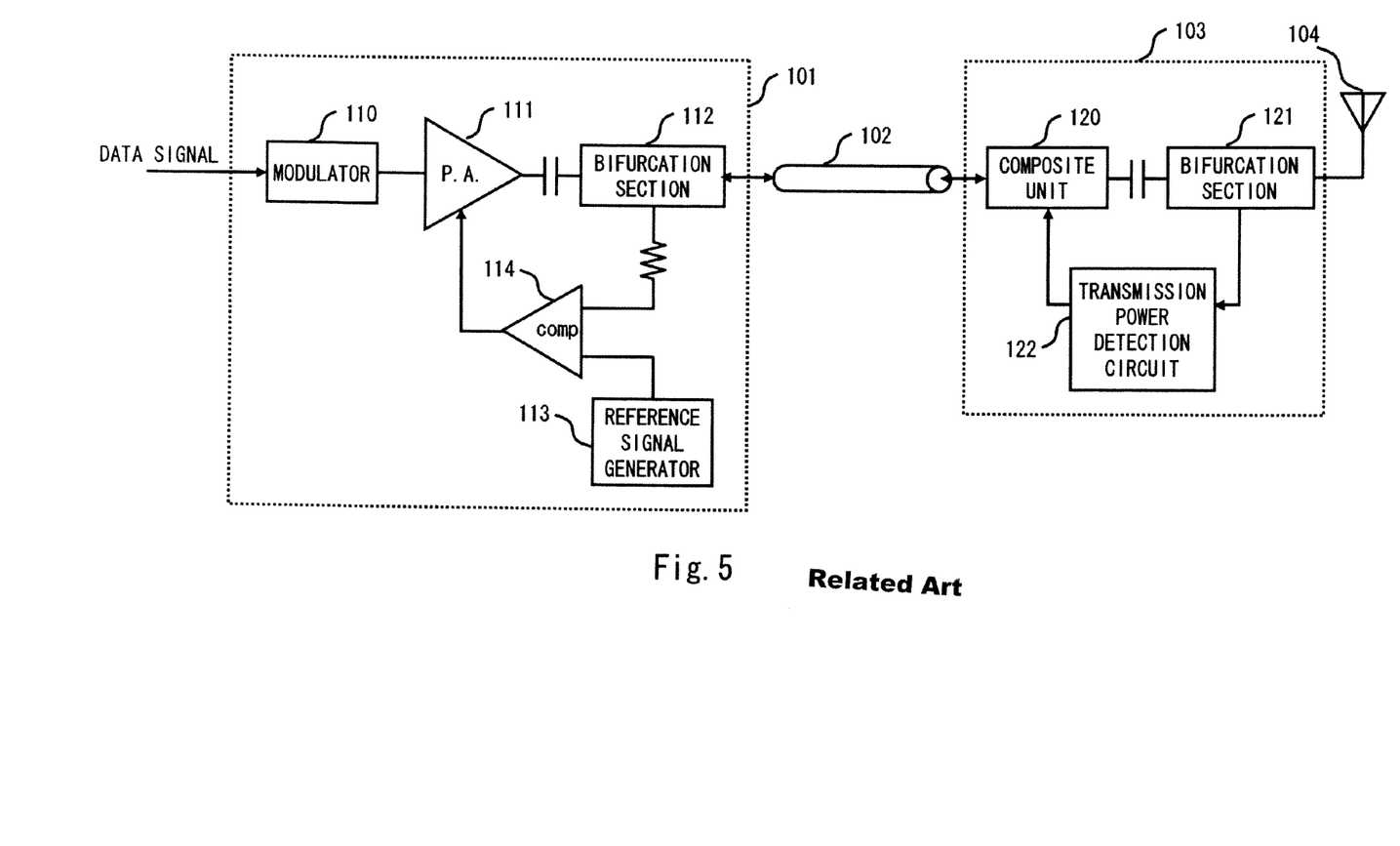
FIG. 5 shows a block diagram of a related transmission circuit.

A related example for compensating the attenuation of the power level occurred at the transmission path is disclosed in Japanese Unexamined Patent Application Publication No. 6-37652. FIG. 5 schematically shows a wireless communication device according to the related example. As shown in FIG. 5, the wireless communication device includes a transmission circuit 101, a transmission path 102, a power sense circuit 103, and an antenna 104. A power amplifier 111 of the transmission circuit 101 amplifies data signals input through a modulator 110 to output the power signal. This power signal passes through the transmission path 102 and the power sense circuit 103 and then the power signal is output from the antenna 104.

The wireless communication device according to the related example detects power level of the power signal output from the antenna 104 by a transmission power detection circuit 122 included in the power sense circuit 103. The transmission power detection circuit 122 receives the power signal output from the antenna 104 through a bifurcation unit 121. Then a direct current voltage obtained at the transmission power detection circuit 122 is transmitted to a comparator 114 through a composite unit 120, the transmission path 102 and bifurcation unit 112. The comparator 114 compares the direct current voltage with reference voltage output from a reference signal generation circuit 113. When it is determined by the comparator 114 that the power signal output from the antenna 104 has smaller power level, the comparator 114 increases the gain of the power amplifier 111. In other words, the wireless communication device according to the related example detects the power loss occurred at the transmission path 102 and increases the gain of the power amplifier 111 according to the detection result, to thereby setting the power level of the power signal output from the antenna 104 to a desired power level.

Japanese Unexamined Patent Application Publication No. 11-340908 discloses a technique for setting power level of the power signal output from the amplifier in advance when the wireless base station device is in non-operating state and for controlling power level of the power signal according to the set value when the wireless base station device is in operating state. However, in the wireless base station device disclosed in Japanese Unexamined Patent Application Publication No. 11-340908, power level output from the amplifier is not set according to the power level of the power signal at the antenna end. Therefore, it is not possible to address power loss of the power signal occurred at the transmission path.

Figure 6:
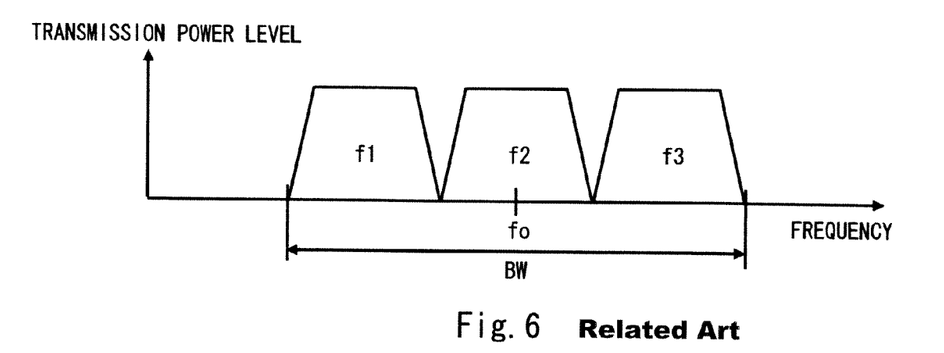
FIG. 6 schematically shows a relationship between frequency of frequency hopping and signal level in MB-OFDM UWB.
Figure 7:
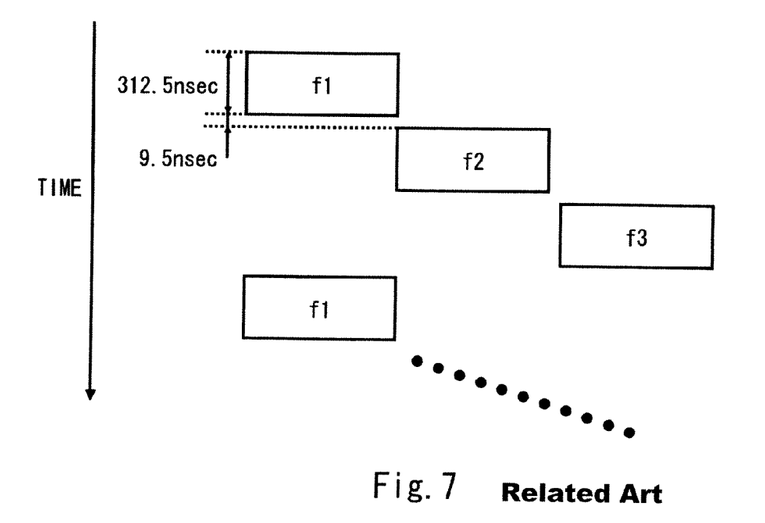
FIG. 7 schematically shows hopping cycle of frequency hopping in MB-OFDM UWB.

A technique called UWB (Ultra Wide Band) has recently been suggested. UWB is defined by FCC (Federal Communications Commission) as wireless signal having fractional bandwidth of 25% or more or wireless signal having bandwidth of 450 MHz or more. UWB is broadly recognized as a system communicated by the wireless signal. One system example for realizing UWB is MB-OFDM (Multi Band-Orthogonal Frequency Division Multiplexing). FIGS. 6 and 7 schematically show the power signal that is transmitted when MB-OFDM type UWB, in other words MB-OFDM UWB is used. FIG. 6 shows a relationship between frequency bandwidth of power signal transmitted in MB-OFDM UWB and power level for each frequency bandwidth. On the other hand, in MB-OFDM, frequency hopping system is used for hopping frequency of the power signal that is transmitted in a predetermined time interval. By using frequency hopping system, it is possible to output instantaneous electric power three times higher than in the system that uses the same bandwidth but does not perform frequency hopping even when average output power is the same. In other words, by employing MB-OFDM, it is possible to almost double maximum propagation distance when minimum receiver sensitivity is constant. OFDM is used in MB-OFDM. OFDM is a communication system that is suitable for constant wireless transmission or small-scale in-building network because OFDM has high efficiency on frequency axis and has high tolerance against fading. Examples of the communication system employing OFDM include digital terrestrial broadcasting and wireless LAN, for example. In digital terrestrial broadcasting, power signal having bandwidth BW of 6 MHz per channel is used. Wireless LAN based on the IEEE 802.11 standard has bandwidth BW of 18 MHz.

In the system employing frequency hopping, power loss with respect to the power signal that is transmitted is different between frequency bands that are hopped. Therefore, extra function is needed in the device used in this system for compensating power loss that is different between frequency bands. Japanese Unexamined Patent Application Publication No. 9-139694, Japanese Unexamined Patent Application Publication No. 2005-269202, and Japanese Unexamined Patent Application Publication No. 8-316880 disclose techniques for measuring or controlling power level of the power signal for each frequency band.

In the technique disclosed in Japanese Unexamined Patent Application Publication No. 9-139694, power level of the power signal is controlled by controlling an attenuator rapidly using control information stored in a memory in advance. In the technique disclosed in Japanese Unexamined Patent Application Publication No. 2005-269202, the power level of the power signal after being modulated is measured based on a training pattern generated according to a hopping pattern of the power signal. When the data signal is transmitted, the power level of the power signal is controlled according to the measurement result. In the technique disclosed in Japanese Unexamined Patent Application Publication No. 8-316880, the power level of the power signal that is transmitted is detected and displayed.

The power signal used in the MB-OFDM UWB has bandwidth BW of 1584 MHz. In other words, in MB-OFDM UWB, wider bandwidth BW is used compared with the system employing other OFDM systems to transmit the power signal.

As stated above, when the signal having wide bandwidth BW is transmitted through the transmission path, power loss generated at the transmission path greatly varies between low frequency band and high frequency band of the bandwidth BW. Therefore, when the power level of the power signal output from the amplifier is controlled without considering power loss generated at the transmission path as techniques disclosed in Japanese Unexamined Patent Application Publication No. 11-340908, Japanese Unexamined Patent Application Publication No. 9-139694, Japanese Unexamined Patent Application Publication No. 2005-269202, and Japanese Unexamined Patent Application Publication No. 8-316880, the power level of the power signal output from the antenna greatly varies between frequency bands due to power loss occurred at the transmission path.

FIG. 7 schematically shows one example of hopping pattern in which the power signal is hopped in MB-OFDM UWB. As shown in FIG. 7, in MB-OFDM UWB, a switching time of the frequency of the power signal (hereinafter referred to as hopping frequency) is 9.5 nsec. For example, when the gain of the amplifier is controlled while outputting the power signal as disclosed in Japanese Unexamined Patent Application Publication No. 6-37652, time of around several msec is typically needed to control this gain. Therefore, the time for switching the hopping frequencies is so short in MB-OFDM UWB that it is quite difficult to control the power level of the power signal for each hopping frequency by using the technique disclosed in Japanese Unexamined Patent Application Publication No. 6-37652.

SUMMARY

According to the present invention, there is provided a transmission circuit transmitting a power signal using frequency hopping system from an antenna connected to the transmission circuit through a transmission path, the transmission circuit including: a controller outputting an amplitude set value for each hopping frequency of the power signal before being transmitted according to power level of the power signal at the antenna; a pre-driver controlling the amplitude of the power signal before being transmitted for each hopping frequency according to the amplitude set value; and a power amplifier outputting the power signal to the transmission path according to the signal output from the pre-driver.

According to the transmission circuit of the present invention, the amplitude set value is set based on the power level of the power signal at the antenna. Then the amplifier outputs the power signal based on the signal whose amplitude is controlled based on the amplitude set value. According to the transmission circuit of the present invention, it is possible to set the power level of the power signal for each hopping frequency based on the amplitude set value in consideration of the power loss occurred at the transmission path that is different between hopping frequencies.

According to the transmission circuit of the present invention, it is possible to set the level of the power signal output from the antenna precisely while switching the hopping frequency in a short period of time despite the power loss occurred in the transmission path.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
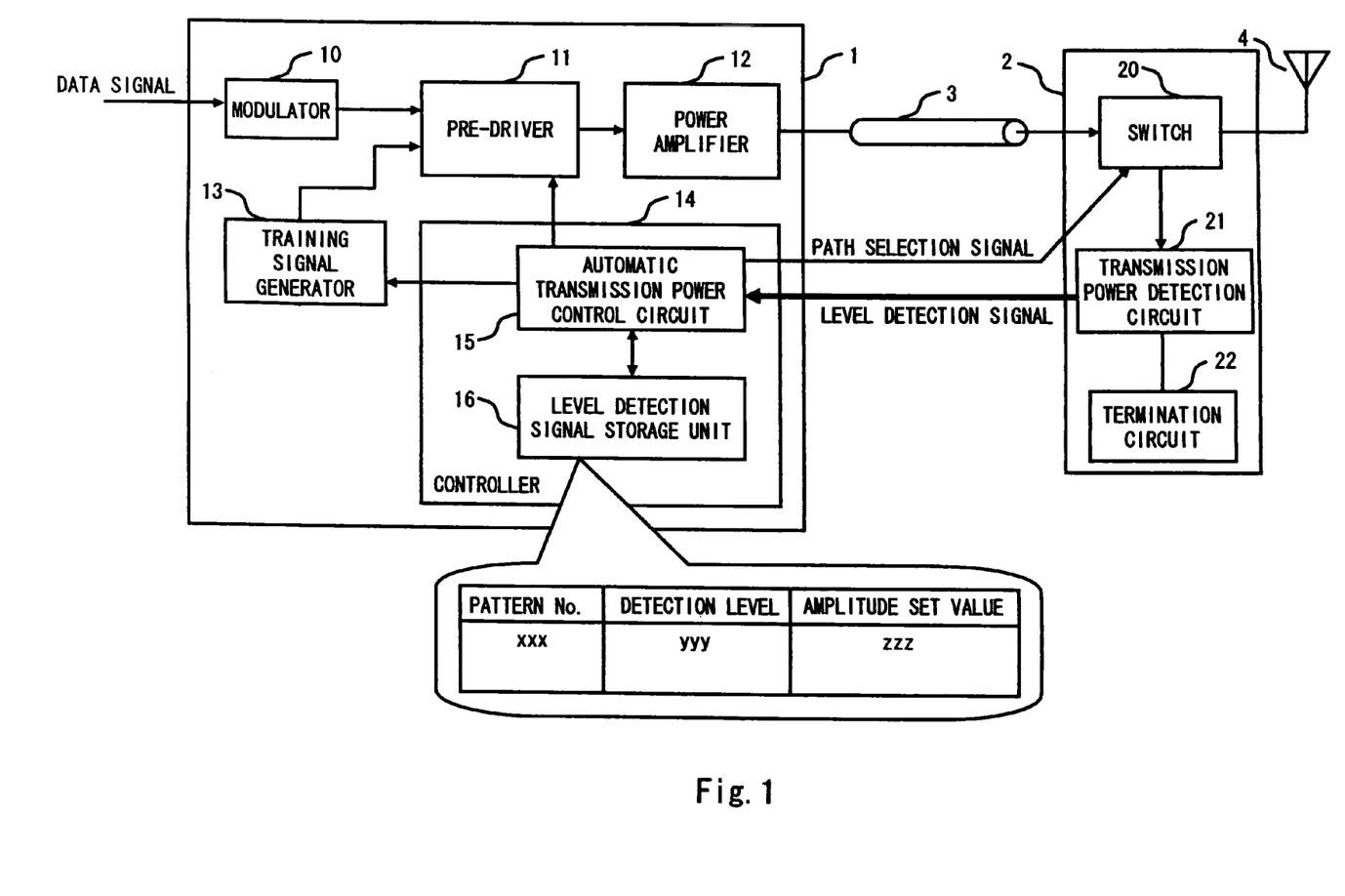
FIG. 1 shows a block diagram of a transmission circuit and a transmission system according to a first embodiment of the present invention.

The embodiment of the present invention will now be described with reference to the drawings. FIG. 1 shows a block diagram of a transmission circuit 1 and a transmission system having the transmission circuit 1 according to the present embodiment. As shown in FIG. 1, the transmission system includes the transmission circuit 1, an antenna circuit 2, a transmission path 3, and an antenna 4.

The transmission circuit 1 receives data that is to be transmitted as a data signal, modulates the received data signal, controls amplitude of the modulated signal, and outputs the signal whose amplitude is controlled as the power signal. Note that the transmission circuit 1 preferably has an occluded structure so as not to be influenced by the radio emitted from the antenna 4 and not to emit unwanted radio other than transmission signal generated at the transmission circuit 1. The transmission path 3 transmits the power signal output from the transmission circuit 1 to the antenna circuit 2 which is disposed separately from the transmission circuit 1. The antenna circuit 2 controls connection and disconnection between the transmission path 3 and the antenna 4. The antenna circuit 2 artificially reproduces the power level of the power signal output from the antenna 4 and detects the power level of the power signal output from the antenna 4.

The transmission circuit 1 and the antenna circuit 2 will now be described further in detail. First, description will be made on the transmitting circuit 1. The transmission circuit 1 includes a modulator 10, a pre-driver 11, a power amplifier 12, a training signal generator 13, and a controller 14. The modulator 10 receives data signal to modulate the received data signal. For example, The modulator 10 does the digital modulation processing (for example QPSK (Quadrature Phase Shift Keying)) to the received data signal, converts the data signal modulated digitally into a digital baseband signal by IFFT (Inverse Fast Fourier Transform), and converts the digital baseband signal into the analog signal. Further, the modulator 10 has a local oscillator that generates a career signal, and modulates the analog signal by the career signal, generates a radio frequency signal (analog signal), and outputs a radio frequency signal to the pre-driver 11. The modulator 10 does not output the signal to pre-driver 11 for the training period. The pre-driver 11 controls the amplitude of the signal output from the modulator 10 or the training signal generator 13 based on an amplitude set value output from the controller 14 and outputs the signal whose amplitude is controlled to the power amplifier 12. The pre-driver 11 is an amplifier and changes a gain based on an amplitude set value output from the controller 14. The pre-driver 11 inputs the signal from the training signal generator 13 for the training period. The power amplifier 12 performs power amplification of the input signal in order to drive the antenna 4 by the amplitude of the signal input from the pre-driver 11. The pre-driver 11 has a low driving ability, and cannot drive the transmission path 3 and the antenna 4. On the other hand, The power amplifier 12 has a high driving ability, and can drive the transmission path 3 and the antenna 4.

The training signal generator 13 has a local oscillator and generates a hopping pattern for training during a training period that is set based on the control signal output from the controller 14. The hopping pattern for training means an analog signal (for example, a test signal) that the transition of the hopping frequency of the power signal that is to be transmitted is reproduced. The training period is set in the period in which the power signal is not output from the antenna 4. The transmission circuit 1 sets the amplitude set value using the hopping pattern for training during the training period.

The controller 14 includes a automatic transmission power control circuit 15 and a level detection signal storage unit 16. The automatic transmission power control circuit 15 calculates the amplitude set value based on the level detection signal input from the antenna circuit 2. The automatic transmission power control circuit 15 switches the amplitude set values transmitted to the pre-driver 11 for each hopping frequency. The level detection signal storage unit 16 is a rewritable storage device such as a flash ROM or RAM, for example. In the example shown in FIG. 1, a table associated with a hopping pattern identification number, power level at the antenna end obtained by the hopping pattern, and the amplitude set value to the hopping pattern is recorded in the level detection signal storage unit 16. The value recorded in this table is calculated by the automatic transmission power control circuit 15. In other words, the automatic transmission power control circuit 15 switches the amplitude set values for each hopping frequency by writing the calculation result in the table of the level detection signal storage unit 16 and reading the value recorded in this table.

The automatic transmission power control circuit 15 outputs control signal to the training signal generator 13 and path selection signal for determining to which of the antenna 4 and the termination circuit in the antenna circuit 2 the transmission path 3 is connected. The path selection signal is input to a switch 20 of the antenna circuit 2 through a path other than the transmission path 3. The antenna circuit 2 will be described later.

The antenna circuit 2 will now be described. The antenna circuit 2 includes the switch 20, a transmission power detection circuit 21, and a dummy antenna circuit (for example a termination circuit) 22. The switch 20 connects the transmission path 3 either to the antenna 4 or the termination circuit 22 based on the path selection signal. Note that the transmission path 3 is connected to the termination circuit 22 through the transmission power detection circuit 21 when the switch 20 connects the transmission path 3 and the termination circuit 22. The transmission power detection circuit 21 detects power level of the power signal generated at the termination circuit 22 based on the power signal output from the transmission circuit 1. The transmission power detection circuit 21 transmits the detected power level to the automatic transmission power control circuit 15 through a different path than the transmission path 3 as the level detection signal. The termination circuit 22 is a circuit that artificially reproduces intrinsic impedance of the antenna 4. The intrinsic impedance varies according to the frequency of the input signal.

Figure 2:
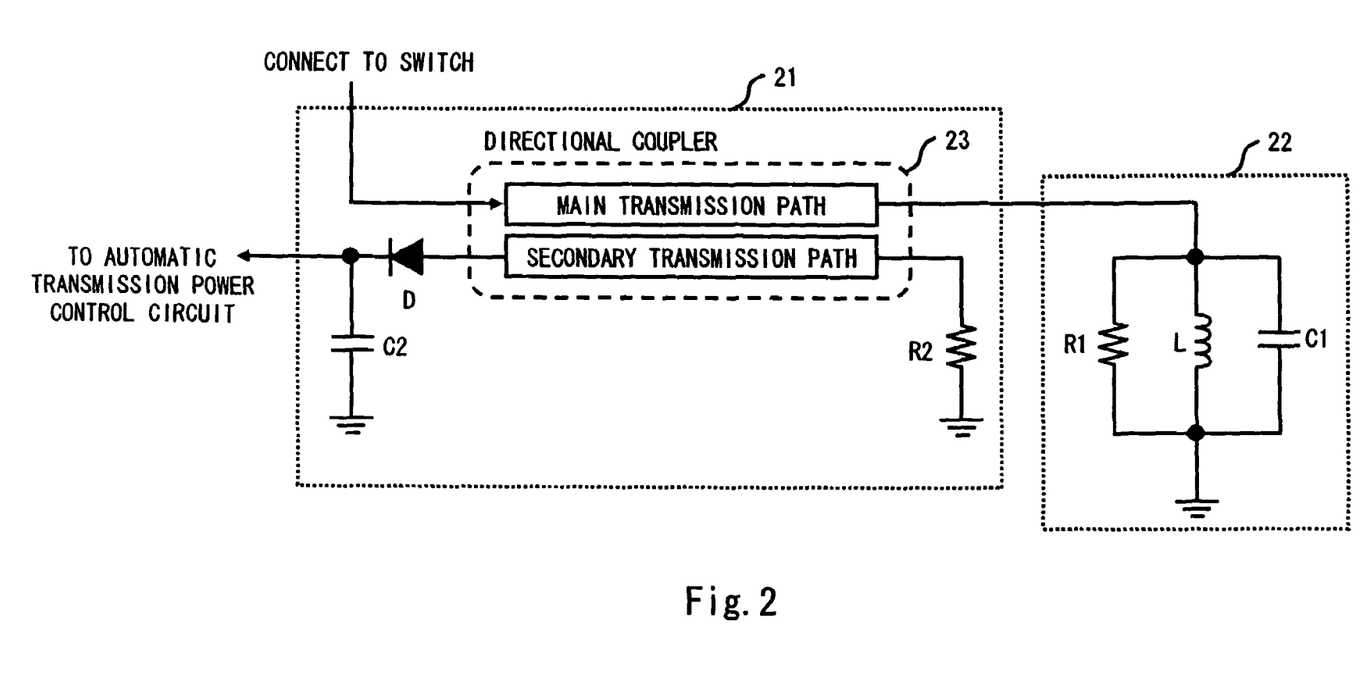
FIG. 2 shows a circuit diagram of a transmission power detection circuit and a termination circuit according to the first embodiment of the present invention.

FIG. 2 shows an example of the circuit diagram of the transmission power detection circuit 21 and the termination circuit 22. The transmission power detection circuit 21 and the termination circuit 22 will further be described in detail with reference to FIG. 2. As shown in FIG. 2, the transmission power detection circuit 21 includes a resistor R2, a capacitor C2, a diode D, and a directional coupler 23. The termination circuit 22 includes a resistor R1, an inductor L, and a capacitor C1.

The directional coupler 23 includes a main transmission path and a secondary transmission path. Then the same signal to the power signal transmitted through the main transmission path (but lower level signal that does not influence the impedance of the main transmission path) is generated in the secondary transmission path. The switch 20 is connected to one end of the main transmission path and the termination circuit 22 is connected to the other end of the main transmission path. The resistor R2 is connected to one end of the secondary transmission path as a terminal resistance and an anode of the diode D is connected to the other end of the secondary transmission path. One end of the capacitor C2 is connected to a cathode of the diode D. The other end of the capacitor C2 is connected to the grounded terminal. The diode D rectifies the power signal generated at the other end of the secondary transmission path. Then voltage is generated at one end of the capacitor C2 based on the rectified signal. The voltage generated at the node between the diode D and the capacitor C2 is transmitted to the automatic transmission power control circuit 15 as level detection signal.

The termination circuit 22 has the resistor R1, the inductor L, and the capacitor C1 between the other end of the directional coupler 23 and the grounded terminal, all of which are connected in parallel. In the present embodiment, the intrinsic impedance of the antenna 4 is reproduced by forming the termination circuit 22 as described above. Note that the connection of the elements at the termination circuit 22 preferably varies as appropriate according to the properties of the antenna 4. The signal having the same power level as the power level generated at the antenna 4 is generated in the main transmission path of the directional coupler 23 by setting the intrinsic impedance of the termination circuit 22 to be the same to the antenna 4.

Figure 3:
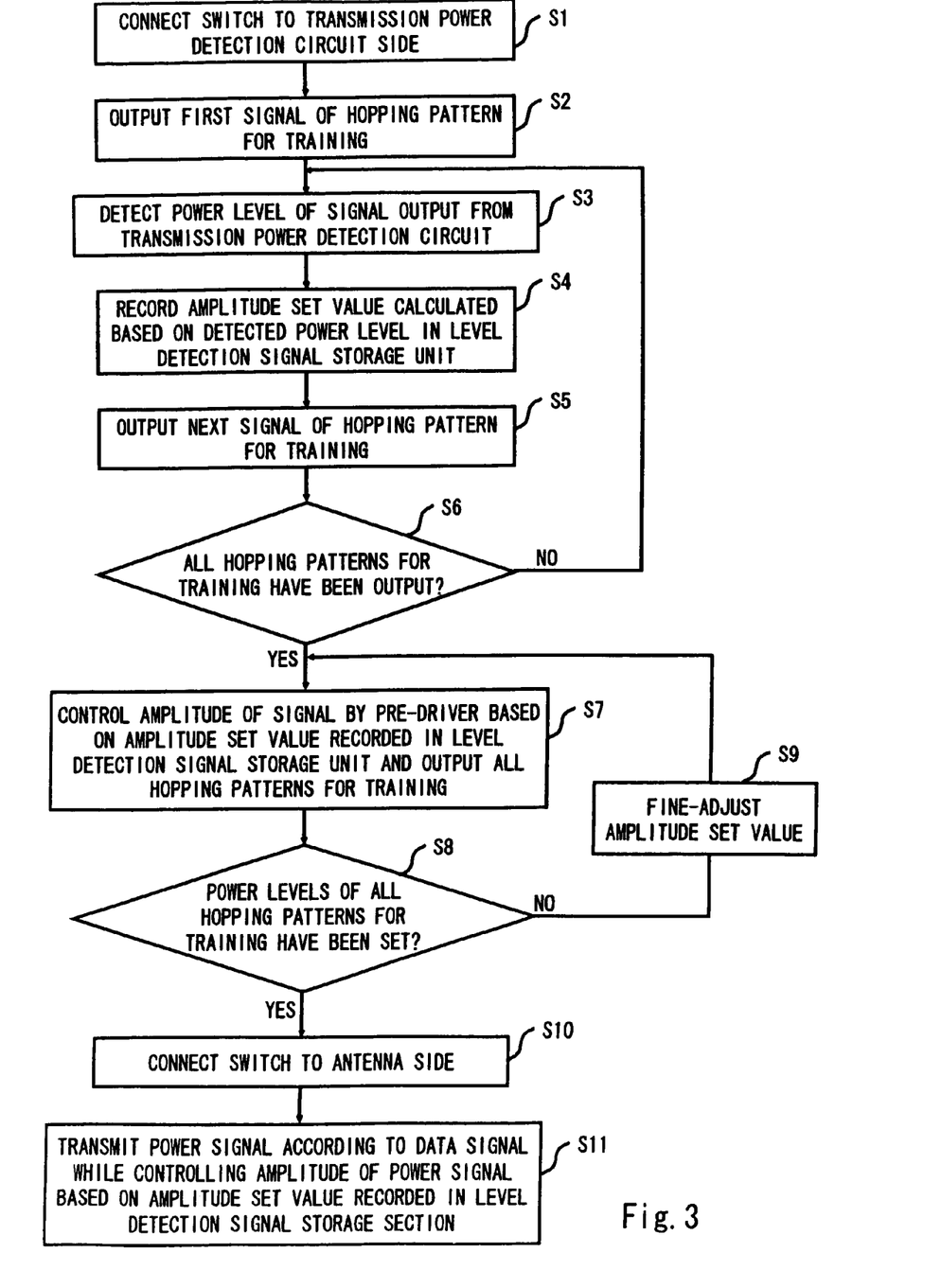
FIG. 3 shows a flow chart showing a behavior of the transmission circuit and the transmission system according to the first embodiment of the present invention.

The behaviors of the transmission circuit 1 and the transmission system according to the present embodiment will now be described. The transmission circuit 1 and the transmission system according to the present embodiment first sets the amplitude set value in view of power loss generated at the transmission path in the training period and then outputs the power signal based on the data signal using this amplitude set value. FIG. 3 shows a flow chart showing a behavior during the training period.

As shown in FIG. 3, when the training is started, the switch 20 is controlled and the transmission path 3 is connected to the transmission power detection circuit 21 by the path selection signal (step S1). In this state, the power signal is not output from the antenna 4. Then a first signal of the hopping pattern for training is output from the training signal generator (step S2). Then power level generated at the termination circuit 22 by the first hopping pattern for training is detected (step S3). Next, the automatic transmission power control circuit 15 calculates the amplitude set value based on the detected power level and records the calculation result in the level detection signal storage unit 16 (step S4).

Then a next signal of the hopping pattern for training is output (step S5). The operations of steps S3 to S5 are repeated until all the hopping patterns for training are output from the training signal generator 13 (step S6). When all the hopping patterns for training are output and power levels for all the patterns are detected, the process goes on to step S7.

In step S7, all the hopping patterns for training are output based on the amplitude set value recorded in the level detection signal storage unit 16 in steps S3 to S6. Then it is determined whether or not the power level generated at the termination circuit 22 by the hopping pattern for training whose amplitude is adjusted based on the amplitude set value recorded in the level detection signal storage unit 16 is substantially constant (step S8). When it is determined in step S8 that the power level is out of the predetermined range, the amplitude set value of the hopping pattern whose power level is out of the predetermined range is fine-adjusted (step S9). Then the power level is verified again in steps S7 and S8. Note that the steps S7 to S9 are not necessarily performed but can be omitted.

On the other hand, when it is determined in step S8 that the power level is within the predetermined range, the switch 20 is controlled by the path selection signal to connect the transmission path 3 and the antenna 4 (step S10). Therefore, it is possible to output the power signal according to the data signal while controlling the amplitude of the power signal based on the amplitude set value recorded in the level detection signal storage unit 16 (step S11).

Figure 4:
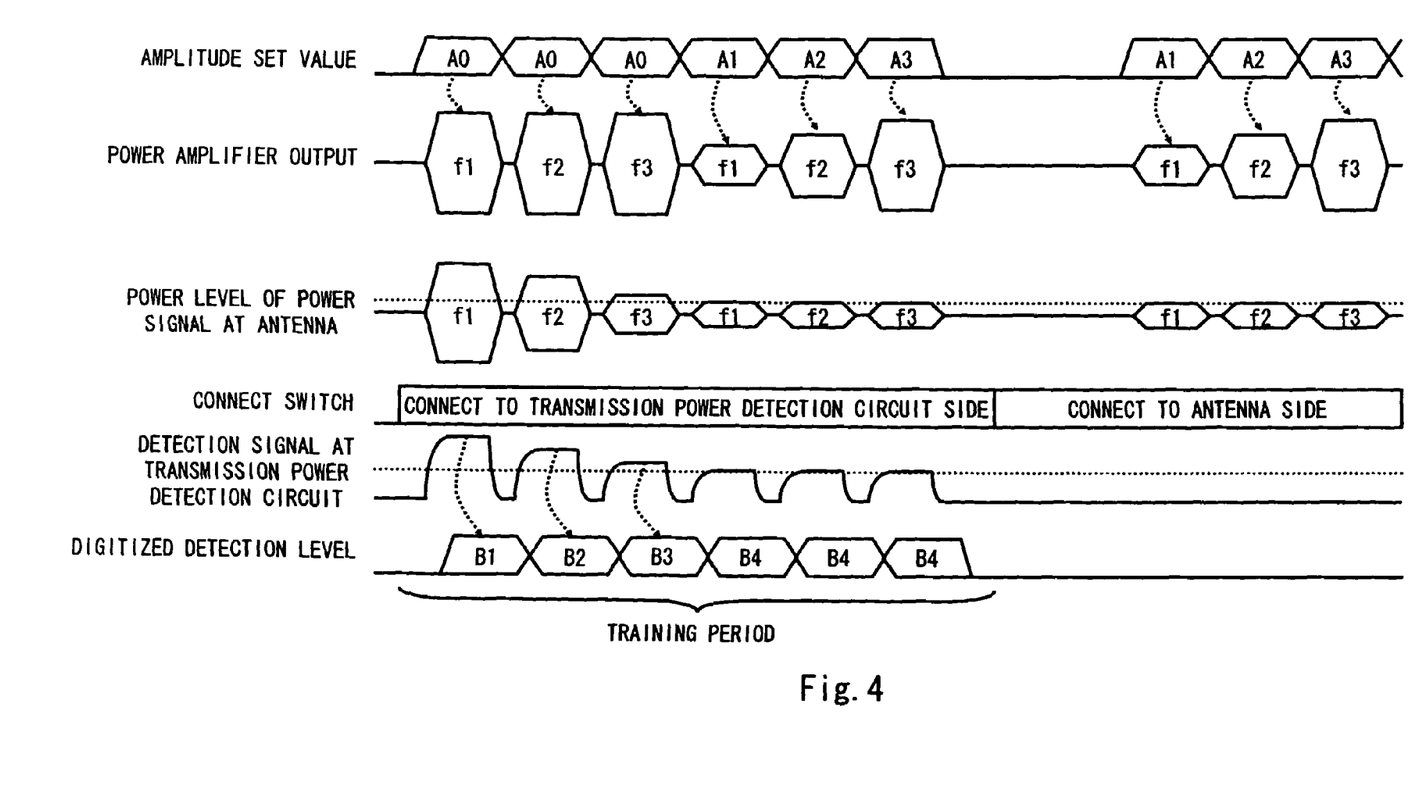
FIG. 4 shows a timing chart showing a behavior of the transmission circuit and the transmission system according to the first embodiment of the present invention.

FIG. 4 shows a timing chart of a behavior of the transmission circuit 1 and the transmission system according to the flow chart shown in FIG. 3. In the example shown in FIG. 4, the transmission circuit 1 transmits the signals using three hopping frequencies (frequencies f1 to f3). Therefore, the hopping pattern for training can be obtained by reproducing three hopping frequencies.

As shown in FIG. 4, the pre-driver 11 of the transmission circuit 1 controls the amplitude of the hopping pattern for training based on initial value A0 of the amplitude set value when the training period is started. In this example, the same initial value of the amplitude set value is used for each of the hopping frequencies f1 to f3. Therefore, the power level of the power signal output from the power amplifier 12 is the same for all the hopping frequencies. On the other hand, the amplitude of the power signal at the antenna that is artificially reproduced by the power signal input to the termination circuit 22 from the power amplifier 12 through the transmission path 3 is the largest in hopping frequency f1 and the smallest in hopping frequency f3. This power signal is transformed into voltage in the transmission power detection circuit 21 and is transmitted to the automatic transmission power control circuit 15 as a level detection signal. The automatic transmission power control circuit 15 digitizes the level detection signal for each hopping frequency to generate the values B1 to B3 that correspond to each hopping frequency. The automatic transmission power control circuit 15 calculates the amplitude set values A1 to A3 for each hopping frequency based on the values B1 to B3 to record the calculation result in the level detection signal storage unit 16. Note that these processes correspond to steps S1 to S6 in FIG. 3.

Each of the amplitude set values A1 to A3 is coefficient having a value of 0 to 1. When the attenuation at the path from the power amplifier 12 to the antenna is small, small value is set. On the other hand, when the attenuation is large, large value is set.

Then the amplitude of the hopping pattern for training is controlled by the pre-driver 11 based on the amplitude set values A1 to A3. The controlled signal is output through the power amplifier 12. In the example shown in FIG. 4, the amplitude of the hopping frequency f1 is the smallest and the amplitude of the hopping frequency f3 is the largest. The power signal is input to the termination circuit 22 through the transmission path 3. Note that the power level generated at the termination circuit 22 is substantially constant at any hopping frequency. It is now confirmed that the power level generated at the termination circuit 22 is substantially constant at the automatic transmission power control circuit 15. After the confirmation is over, the training period is completed. Then the switch 20 is connected to the antenna 4 instead of being connected to the power detection circuit 21.

The transmission circuit 1 then outputs the power signal while switching the amplitude set values A1 to A3 depending on the hopping frequency. Therefore, the power signal having the constant power level at any hopping frequency can be output from the antenna 4.

As can be clear from the above description, the transmission circuit 1 according to the present embodiment sets the amplitude set value for each hopping frequency depending on the power level for each hopping frequency reproduced by the termination circuit 22. The termination circuit 22 has the same intrinsic impedance to the antenna 4. Therefore, the reproduced power level is the same to the power level generated at the antenna 4. The amplitude of the power signal output from the power amplifier 12 is controlled depending on the amplitude set value. Therefore, it is possible to keep the power level substantially constant at the antenna 4 for all the hopping frequencies even when the power loss generated at the transmission path 3 is different between hopping frequencies. In other words, even when the bandwidth BW of the power signal is equal to or more than 1 GHz, it is possible to keep the power level of the power signal output from the antenna 4 substantially constant for all the bandwidths BW.

The amplitude set value is set in the training period in which the power signal is not output from the antenna. The value is not adjusted while the power signal is output from the antenna. Therefore, it is possible for the transmission circuit 1 to adjust the amplitude based on the amplitude set value which is set in advance. It is not needed to perform time-consuming process such as feedback control to control the amplitude of the power signal. Therefore, it is possible for the pre-driver 11 to rapidly control the amplitude of the signal input from the modulator 10.

When the level detection signal is transmitted through the transmission path 3, it may be difficult to detect the power level with high accuracy because the level detection signal and the power signal interfere with each other. However, in the transmission system according to the present embodiment, the level detection signal is transmitted by a path other than the transmission path 3. Therefore, the level detection signal and the power signal do not interfere with each other in the transmission system according to the present embodiment. The transmission path 3 is able to set frequency property in consideration only of the transmission property of the power signal, which makes it possible to simplify verification when the system is set.

In the transmission circuit 1 and the transmission system according to the present embodiment, the transmission circuit 1 is occluded from radiated wave from the antenna. This structure makes it possible for the transmission circuit 1 to stably behave without being influenced by external noise. In the training period, the transmission path 3 and the antenna 4 are disconnected and the transmission path 3 and the termination circuit 22 are connected by the switch 20 of the antenna circuit 2. Therefore, electrical wave is not radiated from the antenna 4 during the training period. Moreover, the termination circuit 22 has the same intrinsic impedance to that of the antenna 4, which means the noise that occurs by the hopping pattern for training being improperly reflected does not occur. According to the transmission system of the present embodiment, even when the signal is output through the transmission path during the training period, electrical wave and noise are not radiated to exterior of the transmission system. Therefore, in the transmission system according to the present embodiment, failure such as malfunction of the other devices does not occur during the training period.

In UWB standard, the power level of the power signal that can be output is set low. In FCC, the average power value per 1 MHz is equal to or lower than −41.3 dBm in EIRP. This value is based on the noise level emitted from the electrical device. According to the transmission circuit 1 of the present embodiment, it is possible to keep the power level of the power signal output from the antenna 4 substantially constant. In other words, when the transmission circuit 1 of the present embodiment is used as the transmission circuit of the system such as UWB, it is possible to make the power level of the output power signal as large as possible in a predetermined range of the standard. Propagation distance of the electrical wave may become shorter as the power level of the power signal becomes smaller. However, in the transmission circuit 1 according to the present embodiment, it is possible to keep the power level of the power signal transmitted from the antenna maximum at any hopping frequency. It is normally quite difficult to keep the power loss of the transmission path 3 constant over the bandwidth of equal to or more than 1 GHz. Therefore, it is quite effective in improving the transmission efficiency to apply the transmission circuit 1 of the present embodiment to the system such as UWB.

It is apparent that the present invention is not limited to the above embodiment, but may be modified and changed without departing from the scope and spirit of the invention. For example, the table of the level detection signal storage unit can be changed as appropriate according to systems.

What is claimed is:

1. A transmission circuit transmitting a power signal using a frequency hopping system from an antenna connected to the transmission circuit through a transmission path, the transmission circuit comprising:

a controller outputting an amplitude set value for each hopping frequency of the power signal before being transmitted according to a power level of the power signal at the antenna;

a pre-driver controlling an amplitude of the power signal before being transmitted for each hopping frequency according to the amplitude set value;

a power amplifier outputting the power signal to the transmission path according to a signal output from the pre-driver; and an antenna circuit, connected between the transmission path and the antenna, detecting a level of the transmission power, wherein the antenna circuit comprises:

a dummy antenna circuit artificially reproducing intrinsic impedance of the antenna;

a transmission power detection circuit detecting the power level occurred at the dummy antenna circuit based on the power signal input through the transmission path and outputs a level detection signal showing the power level of the power signal; and a switch selectively connecting the transmission path and one of the antenna and the dummy antenna circuit.

2. The transmission circuit according to claim 1, wherein the controller comprises a storage circuit holding the amplitude set value for each hopping frequency.

3. The transmission circuit according to claim 1, wherein the amplitude set value includes a quantity of set values equal to a quantity of hopping frequencies.

4. The transmission circuit according to claim 1, wherein the amplitude set value is set such that a level of the power signal at the antenna becomes constant based on a training signal output from the power amplifier during a period where a power is not transmitted from the antenna.

5. The transmission circuit according to claim 1, wherein the power signal has a bandwidth of equal to or more than 1 GHz.

6. The transmission circuit according to claim 1, wherein the level detection signal is transmitted to the controller through ether a wire other than the transmission path.

7. The transmission circuit according to claim 1, wherein the transmission circuit has a structure that is occluded from an electrical wave output from the antenna.

* * * * *